INVENTOR:
A. E. WILLIAMS
BY: Edwin D. Grant
ATTORNEY

INVENTOR:
A. E. WILLIAMS
BY: Edwin D. Grant
ATTORNEY

INVENTOR:
A. E. WILLIAMS
BY: Edwin D. Grant
ATTORNEY

United States Patent Office 3,349,565
Patented Oct. 31, 1967

3,349,565
VARIABLE THRUST SOLID PROPELLANT
ROCKET MOTOR
Allan E. Williams, Elkton, Md., assignor to Thiokol
Chemical Corporation, Bristol, Pa., a corporation
of Delaware
Filed Oct. 14, 1965, Ser. No. 495,991
2 Claims. (Cl. 60—254)

ABSTRACT OF THE DISCLOSURE

Variable thrust solid propellant rocket motor comprising (1) a first solid propellant grain bonded to the inner surface of the casing of said rocket motor and formed with a rearwardly convergent, longitudinally extending perforation, (2) a second solid propellant grain concentrically disposed within the perforation of said first grain and formed with a rearwardly convergent surface that conforms with, and is spaced from, the wall of said perforation, and (3) means for moving said second grain longitudinally of said perforation in said first grain to control the distance between the adjacent surfaces of said grains.

---

This invention relates to a rocket motor and, more particularly, to a rocket motor provided with means for controlling the burning rate of the propellant thereof.

Since the amount of gas generated by combustion of the solid propellant grains employed in some rocket motors depends upon the area of such grains exposed to burning, it is obviously advantageous for a high-thrust solid propellant rocket motor to have a grain, or grains, with a large burning surface. It is also advantageous to provide a solid propellant rocket motor with means for controlling the burning rate of the propellant thereof, so that the thrust produced by the rocket motor can be varied in accordance with a desired program. In a rocket motor constituting a preferred embodiment of this invention, two solid propellant grains are utilized, these grains being constructed and arranged to provide large surfaces exposed to burning and, in conjunction with other components of the invention that will be described hereinafter, to provide effective control of the thrust generated by the rocket motor. More particularly, the two solid propellant grains of the rocket motor disclosed herein are disposed in concentric relation, and one of the grains is movable longitudinally of the casing of said rocket motor. The burning surfaces of the two grains are adjacent and converge toward the thrust nozzle of the rocket motor, so that motion of the movable grain longitudinally of the casing of the rocket motor varies the distance between said burning surfaces of the grains and thus varies the burning rates thereof.

Accordingly, it is an object of this invention to provide a rocket motor having means for controlling the burning rate of the propellant thereof.

Another object of this invention is to provide a rocket motor having two solid propellant grains which provide burning surfaces of larger area than can be obtained in a rocket motor with a solid propellant grain of the end-burning type, and which are so designed that movement of one of said grains longitudinally of the casing of said rocket motor varies the distance between said burning surfaces of said grains.

An additional object of the invention is to provide a rocket motor having means for controlling the thrust thereof by varying the distance between the burning surfaces of two solid propellant grains utilized in the rocket motor, and also by varying the throat area of the thrust nozzle of said rocket motor.

Figure 1:
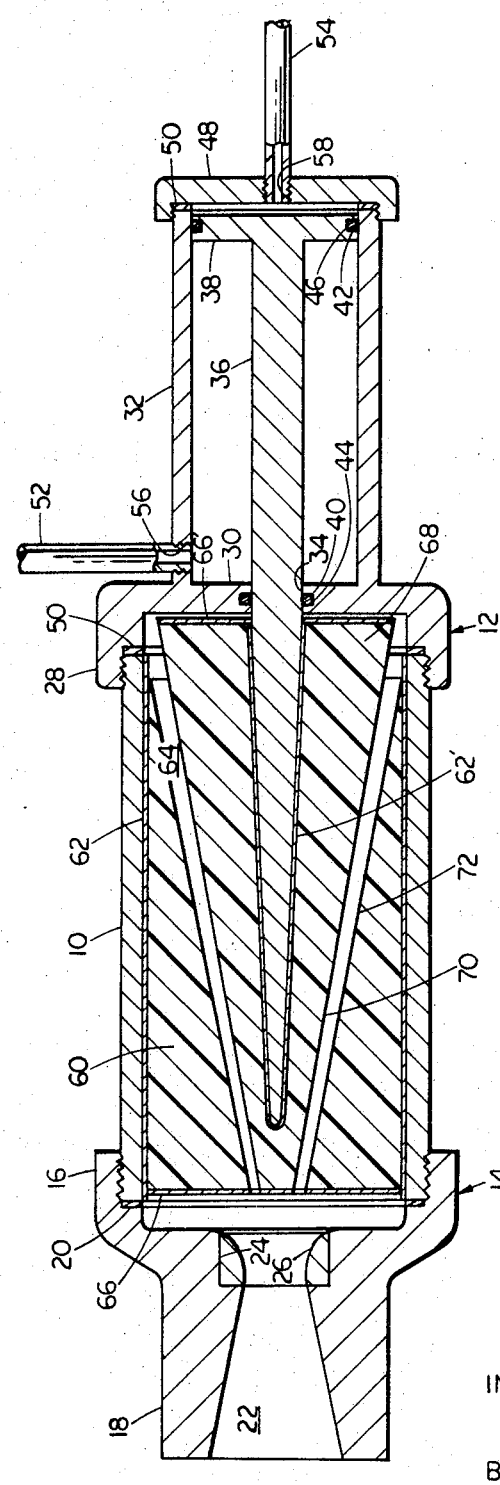
Figure 2:
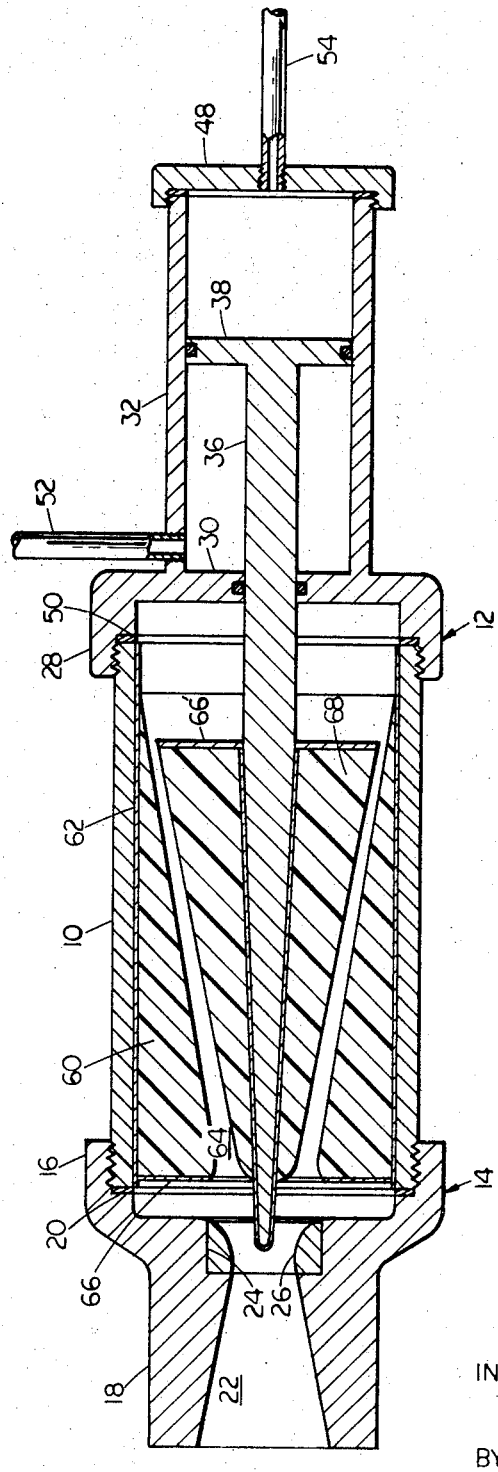
Figure 3:
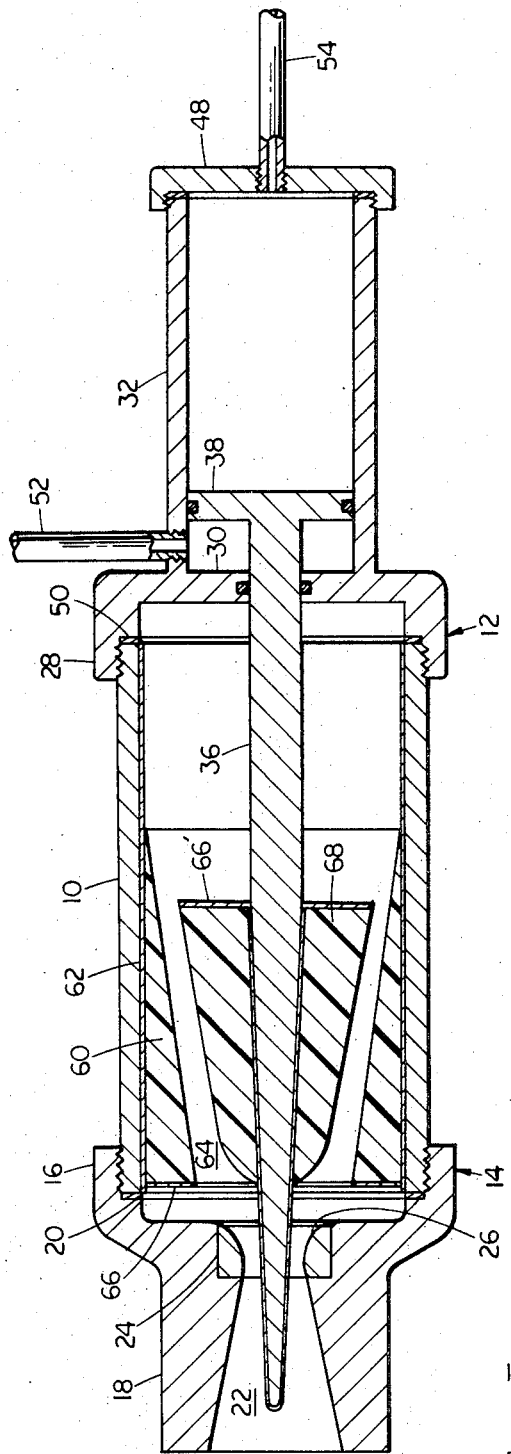

Other objects of the invention will become apparent in the following description of a preferred embodiment thereof, in which reference is made to the accompanying drawings, wherein:

FIGURE 1 is a sectional view of a rocket motor constituting a preferred embodiment of the invention, taken along a plane which passes through the longitudinal axis of the rocket motor and illustrating the relation of components of the rocket motor before it is fired; and FIGURES 2 and 3 are sectional views of the same rocket motor, taken along the same plane as in FIGURE 1 and respectively illustrating the relation of components of the rocket motor at two stages of its operation.

Throughout the specification and drawings like reference numbers refer to like parts.

In each of the drawings is illustrated a rocket motor comprising a cylindrical casing 10 having forward and aft end closures which are fixedly secured to respective ends thereof and generally designated in the drawings by the numbers 12, 14. Aft end closure 14 includes a cylindrical forward portion 16 which is threadedly engaged with the aft end of casing 10 and a rearwardly and inwardly extending portion 18 which is integral with said forward portion. A seal ring 20 is disposed between the aft end surface of casing 10 and end closure 14 to facilitate formation of a sealed joint therebetween. Portion 18 of aft end closure 14 is provided with a longitudinally extending aperture 22 which includes a circumferentially extending recess 24 at the forward end thereof, an annular insert 26 being fixedly bonded to the walls of this recess. The common longitudinal axis of aperture 22 and insert 26 is coincident with the longitudinal axis of casing 10, and the rear portion of the wall of said aperture and the inner surface of said insert form a converging-diverging orifice. Thus, for the purpose of interpretation of claims to the invention appended hereto, portion 18 of aft end closure 14 constitutes a thrust nozzle connected to said end closure.

Forward end closure 12 includes a cylindrical rear portion 28 which is threadedly engaged with the forward end of casing 10, a radially extending portion 30 which is integral with said portion 28, and a cylindrical forward portion 32 which is integral with said portion 30. An aperture 34 is formed in portion 30 of the forward end closure, the longitudinal axis of this aperture being coincident with the longitudinal axis of casing 10. A drive shaft 36 is slidably disposed in aperture 34, the forward end of this drive shaft being integrally joined to a piston 38, the peripheral surface of which is slidably engaged with the inner surface of portion 32 of forward end closure 12. Seal rings 40, 42 are respectively positioned in grooves 44, 46 formed in the wall of aperture 34 and the peripheral surface of piston 38 respectively. A cap 48 is threadedly engaged with the forward end of portion 32 of forward end closure 12, and a seal ring 50 is disposed between these two members to facilitate formation of a sealed joint therebetween. Conduits 52, 54 are respectively threadedly engaged within apertures 56, 58 which extend through the wall of portion 32 of forward end closure 12 and the wall of cap 48 respectively, these conduits being connected to means (not shown) adapted to force pressurized fluid into said portion 32 of said forward end closure. Thus, portion 32 of forward end closure 12, drive shaft 36, piston 38, cap 48 and conduits 52, 54 constitute a hydraulic cylinder mounted on said forward end closure. A first combustible grain 60 of solid propellant is disposed within casing 10 and extends longitudinally thereof, the peripheral surface of this grain being bonded to the inner surface of said casing by means of a suitable liner material 62. A rearwardly converging aperture 64 extends between the ends of grain 60, and an inhibitor material 66 is bonded to the aft end surface of the grain. Drive shaft 36 extends longitudinally of casing 10 to a point near the aft end of grain 60 and its peripheral surface is rearwardly convergent from a point thereon that is located immediately aft of portion 30 of forward end closure 12 when the drive shaft is in the forwardly extended position illustrated in FIG. 1. Concentrically disposed within the aperture 64 in grain 60 and fixedly mounted on drive shaft 36 is a second grain 68 the peripheral surface 70 of which is rearwardly convergent. More particularly, grain 68 is bonded to drive shaft 36 by means of liner material 62', and for a reason that will be explained hereinafter, the forward portion of its peripheral surface 70 is spaced slightly farther from the inner surface 72 of grain 60 than is the rear portion of its peripheral surface. Inhibitor material 66' is bonded to the forward end surface of grain 68. A suitable igniter (not shown) is provided to ignite the adjacent surfaces 72, 70 of said first and second grains 60, 68 respectively when the rocket is to be fired.

In the preferred embodiment of the invention, casing 10, end closures 12, 14, drive shaft 36, piston cap 48, and conduits 52, 54 are formed of a suitable metal such as steel or an aluminum alloy. Seal rings 20, 40, 42, 50 are made of an elastomeric material, and insert 26 is made of a hard, heat-resistant graphite material or of a heat-resistant metal such as molybdenum alloy. Grains 60, 68 may be any one of the many solid propellants employed in rocket motors, these grains being bonded to casing 10 and drive shaft 36 respectively by any one of the many liner materials that are presently used in rocket motor manufacture. The inhibitor material 66, 66' bonded to the aft end surface of grain 60 and the forward end surface of grain 68 may be any of the well-known materials that will prevent these surfaces from being ignited during the combustion of said grains.

It has been demonstrated that if there is a very narrow slot in a solid propellant grain, the propellant burning rate in the area of the slot is greatly increased. This may result from conditions which enhance erosive burning or which increase local pressure on the propellant burning surface adjacent the slot.

Hence, after the adjacent surfaces 70, 72 of grains 68, 60 are ignited their burning rates can be increased by varying the position of drive shaft 36 relative to casing 10, which, because of the geometric configuration of said grains, moves the surfaces 70, 72 thereof closer together or farther apart respectively. Movement of drive shaft 36 in either a forward or aft direction can readily be accomplished by selective variation of the pressure applied to opposite sides of the piston 38 of the hydraulic cylinder mounted on forward end closure 12. As has been mentioned hereinbefore, the forward portion of the peripheral surface 70 of grain 68 is initially spaced farther from the inner surface 72 of grain 60 than is the rear portion of said surface 70. However, the velocity of gaseous products of combustion of both grains 60, 68 is manifestly greater at the rear end of the annular passage between the grains than it is at the forward end thereof, and hence erosion of the surfaces 70, 72 of the grains is greatest at their rear portions. As illustrated in FIGS. 2 and 3, the distance between the rear portions of surfaces 70, 72 thus becomes greater than the distance between the forward portions of said surfaces, even though drive shaft 36 is moved in an aft direction during the burning of grains 60, 68 to maintain the spacing therebetween. It is nevertheless possible, through proper design of the slope of each surface 70, 72 relative to the longitudinal axis of casing 10 and through control of the distance between said surfaces by movement of drive shaft 36 longitudinally of said casing, to program the burning rates of grains 68, 60 throughout the firing period of the rocket motor. Additional control of the pressure within casing 10 is provided by means of drive shaft 36, the aft end of which enters the throat of the orifice in portion 18 at aft end closure 14 when combustion of grains 60, 68 has proceeded to the point illustrated in FIG. 2. Near the end of the firing period of the rocket motor, drive shaft 36 is positioned as illustrated in FIG. 3, and the pressure within casing 10 is thus maintained relatively constant as the amount of gas generated by combustion of grains 60, 68 decreases. It is to be understood that the inhibitor material 66 bonded to the aft end face of grain 60, the thickness of which is exaggerated in the drawings for the purpose of clarity, is removed progressively as said grain is consumed and thus does not prevent motion of drive shaft 36 and grain 68 in an aft direction.

While only one form of this invention has been described and illustrated, it will be apparent to those skilled in the art that other embodiments and modifications of the disclosed rocket motor can be made without departing in any way from the scope of the invention, for the limits of which reference must be made to the appended claims.

What is claimed is:
1. A rocket motor comprising:
   a casing having the aft end thereof connected to a thrust nozzle;
   a first combustible grain disposed within said casing and extending longitudinally thereof, the peripheral surface of said grain being bonded to the inner surface of said casing, said first grain having a rearwardly convergent aperture which extends between the ends thereof and having an inhibitor material bonded to its aft end surface;
   a second combustible grain concentrically disposed within said aperture and in said first grain, the peripheral surface of said second grain being rearwardly convergent and an inhibitor material being bonded to the forward end surface of said grain; and
   drive means carried by said casing for moving said second grain longitudinally of said aperture in said first grain to thereby control the distance between the wall of said aperture and the peripheral surface of said second grain.
2. A rocket motor as defined in claim 1 wherein said drive means comprises a drive shaft which is substantially coaxial with the longitudinal axis of said thrust nozzle and which extends through said second grain to a point adjacent the aft end thereof, the aft end of said drive shaft entering the orifice of said thrust nozzle as said drive shaft is moved in an aft direction.

References Cited
UNITED STATES PATENTS

| | | | |
|---|---|---|---|
| 2,981,060 | 4/1961 | Barnes | 60—254 |
| 3,133,410 | 5/1964 | Gessner | 60—39.47 X |
| 3,136,122 | 6/1964 | McJones | 60—39.47 |
| 3,183,665 | 5/1965 | Webb | 60—39.47 X |

CARLTON R. CROYLE, *Primary Examiner.*